US011804686B2

(12) United States Patent
Flores et al.

(10) Patent No.: US 11,804,686 B2
(45) Date of Patent: Oct. 31, 2023

(54) COMPACT AUXILIARY CONNECTOR

(71) Applicant: Schneider Electric USA, Inc., Andover, MA (US)

(72) Inventors: Sergio Flores, Smyrna, TN (US); Matthew Alan Williford, Nashville, TN (US); Bhushan Kumbalwar, Smyrna, TN (US); Gregory O. Motley, Murfreesboro, TN (US); Eldridge R. Byron, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 9 days.

(21) Appl. No.: 17/558,745

(22) Filed: Dec. 22, 2021

(65) Prior Publication Data

US 2022/0209485 A1 Jun. 30, 2022

Related U.S. Application Data

(60) Provisional application No. 63/131,338, filed on Dec. 29, 2020.

(51) Int. Cl.
 *H01R 43/26* (2006.01)
 *H01R 13/53* (2006.01)
 *H02B 13/035* (2006.01)

(52) U.S. Cl.
 CPC ............ *H01R 43/26* (2013.01); *H01R 13/53* (2013.01); *H02B 13/0358* (2013.01)

(58) Field of Classification Search
 CPC .. H01H 69/00; H01H 71/0207; H02B 11/173; H02B 1/21; H02B 13/0358; H01R 43/26; H01R 13/53
 See application file for complete search history.

(56) References Cited

U.S. PATENT DOCUMENTS

2016/0164268 A1\* 6/2016 Yang ...................... H02B 11/26
                                                            361/620
2017/0170638 A1\* 6/2017 Waynick, Sr. ........... H02B 1/20

FOREIGN PATENT DOCUMENTS

DE          3628840 A1    4/1987
EP          3029789 A1    6/2016
              (Continued)

OTHER PUBLICATIONS

Extended European Search Report (EESR) dated May 11, 2022 for corresponding European Patent Application No. 21214863.9-1201, 9 pages.

*Primary Examiner* — Gary F Paumen
(74) *Attorney, Agent, or Firm* — Locke Lord LLP (57) ABSTRACT

A compact auxiliary connector can include two bushings each with an electrical connector(s), and a tubing connected between the two bushings to insulate an electrical cable, which is connected between electrical connectors of the two bushings. The electrical connector of each of the two bushings can be connected to an electrical device, a line or load bus or a combination thereof, according to the desired connection configuration. Each bushing may also include a flexible joint cover, such as a boot, to cover the connection of the bushing connectors to a bus, such as a primary bus. The compact auxiliary connector can manage live connections between auxiliary or other device(s) and line/load buses in a switchgear cabinet of a switchgear assembly. The bushings, tubing and flexible joint cover can be formed of insulating materials having desired dielectric strength according to the voltage applications.

20 Claims, 4 Drawing Sheets

(56) References Cited

FOREIGN PATENT DOCUMENTS

| | | | |
|---|---|---|---|
| JP | 55153807 | U | 11/1980 |
| JP | 775223 | A | 3/1995 |
| JP | 3081949 | B2 | 8/2000 |

* cited by examiner

COMPACT AUXILIARY CONNECTOR

CROSS REFERENCE TO RELATED APPLICATIONS

This application claims the benefit of and priority to U.S. Provisional Application No. 63/131,338, filed on Dec. 29, 2020 under 35 U.S.C. 119(e), which application is incorporated by reference herein in its entirety.

TECHNICAL FIELD

The present disclosure relates to cable and bus assembly for a switchgear assembly, and more particularly, to a compact connector assembly for a switchgear assembly.

BACKGROUND

In medium voltage (MV) switchgear applications, voltage and control power (CP) transformers may be mounted vertically next to each other in a compartment(s) (e.g., a cubicle(s)) of a cabinet of a switchgear (also referred to as a switchgear assembly). The primary connection to these transformers is typically cables or buses, which are connected to the line or load side bus within the switchgear. When a common source is required for both of the transformers, a bus or cable connection is also made between each component. These bus or cable connections in 15,000 volt applications may require a certain air gap or insulating means to properly manage the required electrical clearances. Because of the complexity of these bus and cable connections, the primary compartment or area designated for making these connections can have a depth of at least 14 to 15 inches.

SUMMARY

To address these and other shortcomings, a connector assembly is provided for connecting a bus to one or more auxiliary devices in a switchgear assembly, in accordance with an embodiment. The connector assembly can include first and second bushing assemblies. Each of the first and second bushing assemblies can include: a bushing having opposing first and second open ends with a cavity extending therethrough, the cavity being separated by a wall into first and second cavities which open to first and second open ends respectively, the wall having an opening extending between the first and second cavities, the bushing formed of an insulating material; a connector formed of a conductive material and arranged in the cavity, the connector having a portion extending through the opening of the interior wall, the connector having a first end with a first terminal in the first cavity of the bushing and an opposing second end in the second cavity; and a flexible joint cover connectable over a portion of the bushing to enclose the second cavity with the second end of the connector, the flexible joint cover having a first slot through which to receive a conductor from a line or load bus for connection to the second end. The connector assembly can further include a tubing, connected between the flexible joint covers of the first and second bushing assemblies, for housing a conductive cable which is connected between the second ends of the connectors of the first and second bushing assemblies.

In some embodiments, the second end of the connector can include at least two second terminals separated from each other. The conductive cable can be connected between one of the two second terminals of the first bushing assembly and one of the two second terminals of the second bushing assembly.

The various embodiments, the first terminal of the connector for each of the first and second bushing assemblies can be configured to connect to a terminal of a device in a compartment of a switchgear cabinet of a switchgear assembly. The first device can be a control power transformer or a voltage transformer. The first and second bushing assemblies along with the tubing can utilize 5.5 or fewer inches in depth of a primary compartment of the switchgear cabinet to electrically connect a line or load bus to the first device. The first and second bushing assemblies together with the tubing can be configured to operate in a voltage class of 15 kV, 95 kV Basic Insulation Level (BIL).

In some embodiments, the flexible joint cover can be a polyvinyl chloride (PVC) boot which is detachably connectable over the portion of the bushing to enclose the second cavity with the second end. The tubing can be a phenolic tube. Each connector of the first and second bushing assemblies can have a Z-shape.

In accordance with a further embodiment, a switchgear assembly can include: a switchgear cabinet including an auxiliary compartment, a cable compartment and a bus bar compartment; a multi-phase power bus system including line and load buses for distributing multi-phase power; a first device in the auxiliary compartment of the switchgear cabinet; and a plurality of the connector assemblies each for a respective power phase, each of the connector assemblies having the first terminal of the connector of one of the first or second bushing assembly connected to the first device for a respective power phase and the second end of the connector of the first or second bushing assembly connected to a respective power phase of the line or load bus of the multi-phase power bus system.

In some embodiments, the switchgear assembly can further include a second device in the auxiliary compartment of the switchgear cabinet, and the first and second devices can be mounted vertically next to one another in the auxiliary compartment. Each of the connector assemblies can have the first terminal of the other one of the first or second bushing assembly connected to the second device for a respective power phase. Furthermore, the first device can be a control power transformer and the second device is a voltage transformer. The first and second bushing assemblies along with the tubing can utilize 5.5 or fewer inches in depth of the switchgear cabinet to electrically connect a line or load bus to the first device. Each of the connector assemblies can be configured to operate in a voltage class of 15 kV, 95 kV Basic Insulation Level (BIL).

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

A compact auxiliary connector can include two bushings each with an electrical connector(s), and a tubing (or "tube") connected between the two bushings to insulate an electrical cable, which is connected between electrical connectors of the two bushings. The electrical connector of each of the two bushings can be connected to an electrical device, a bus (e.g., for line or load) or a combination thereof, according to the desired connection configuration. Each bushing may also include a flexible joint cover, such as a boot, to cover the connection of the bushing connectors to a bus, such as a primary bus. The compact auxiliary connector can manage live connections between auxiliary or other device(s) and line/load buses in a switchgear cabinet (or enclosure) of a switchgear assembly. The bushings, tubing and flexible joint cover can be formed of insulating materials having desired dielectric strength according to the voltage applications.

The compact auxiliary connector of the present disclosure can allow a significant reduction in parts and compartment size for supporting, for example, medium voltage primary connections to auxiliary transformers. This reduction is valuable in allowing a reduced equipment depth while maintaining a safe and reliable live part connection in small enclosures. For example, the use of such compact auxiliary connectors as described herein can be more economical than using increased enclosure size with bus bars and insulators. Furthermore, the design of the connector assembly can also sufficiently manage strike and tracking distances and dielectric strength at desired rated voltage, such as for medium or other voltage applications (e.g., 15 kV, 95 kV Basic Insulation Level (BIL) applications). The compact auxiliary connector can also allow live parts to be safely mounted within a compartment of 5.5 inches (or 139.7 mm) of grounded metal. The compact auxiliary connector can provide adequate air clearances between live parts and grounded metal to avoid dangerous potential partial discharge issues.

An example compact auxiliary connector will be described below with reference to the figures, in accordance with the present disclosure.

Figure 1:
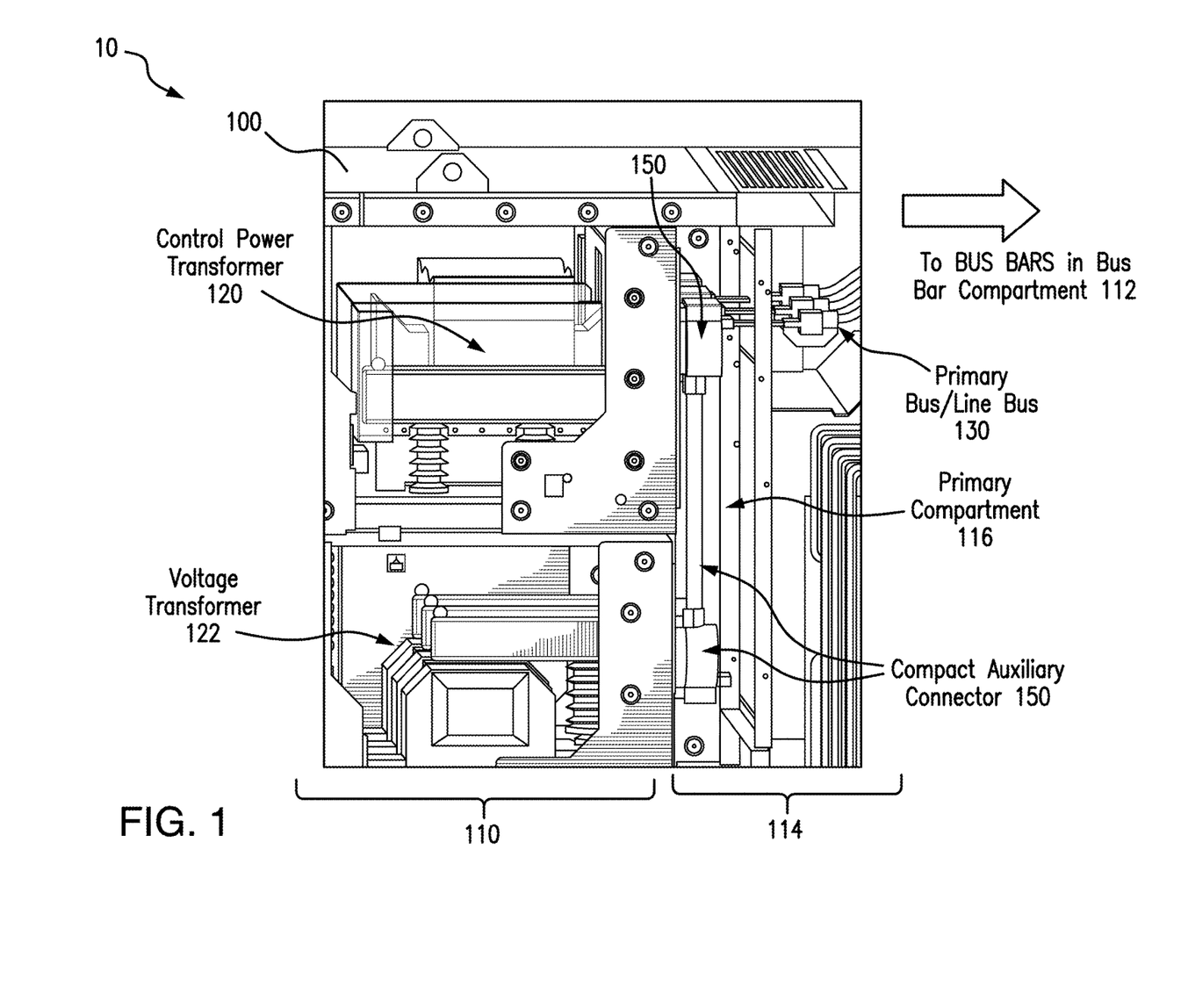
FIG. 1 illustrates a partial cross-sectional view of a switchgear assembly including a compact auxiliary connector(s) in a primary compartment of a switchgear cabinet, in accordance with an embodiment described herein.

FIG. 1 shows a partial view of an example switchgear assembly 10, which includes a switchgear cabinet 100 for housing switching and auxiliary devices, electrical connectors/cabling and bus bars. In this example, the switchgear assembly 10 is for a multi-phase power distribution system, such as a three-phase power distribution system. The switchgear cabinet 100 can include a plurality of compartments for housing switching and/or auxiliary devices, electrical cables and conductors, bus bars for line and load, and other components. The compartments can, for example, include: a switching and/or auxiliary compartment(s) 110 for housing switching and/or auxiliary electrical device(s) such as circuit breakers, transformers and other protective devices; a bus bar compartment(s) 112 (not shown) for housing line and load bus bars connected to a power source and various loads, respectively; and a cable compartment(s) 114 for housing conductors or electrical cables (generally referred to as cables) which connect various devices, bus bars and other components in the switchgear cabinet 10. In this example, the auxiliary compartment(s) can house auxiliary devices, such as a control power (CP) transformer 120 and a voltage transformer 122, which are vertically stacked, e.g., one above the other, in the auxiliary compartment(s) 110 of the switchgear cabinet 100. A compartment 116, which is referred to as a primary compartment, is where connection is made between electrical equipment (e.g., medium voltage equipment) and a primary bus 130.

Figure 2:
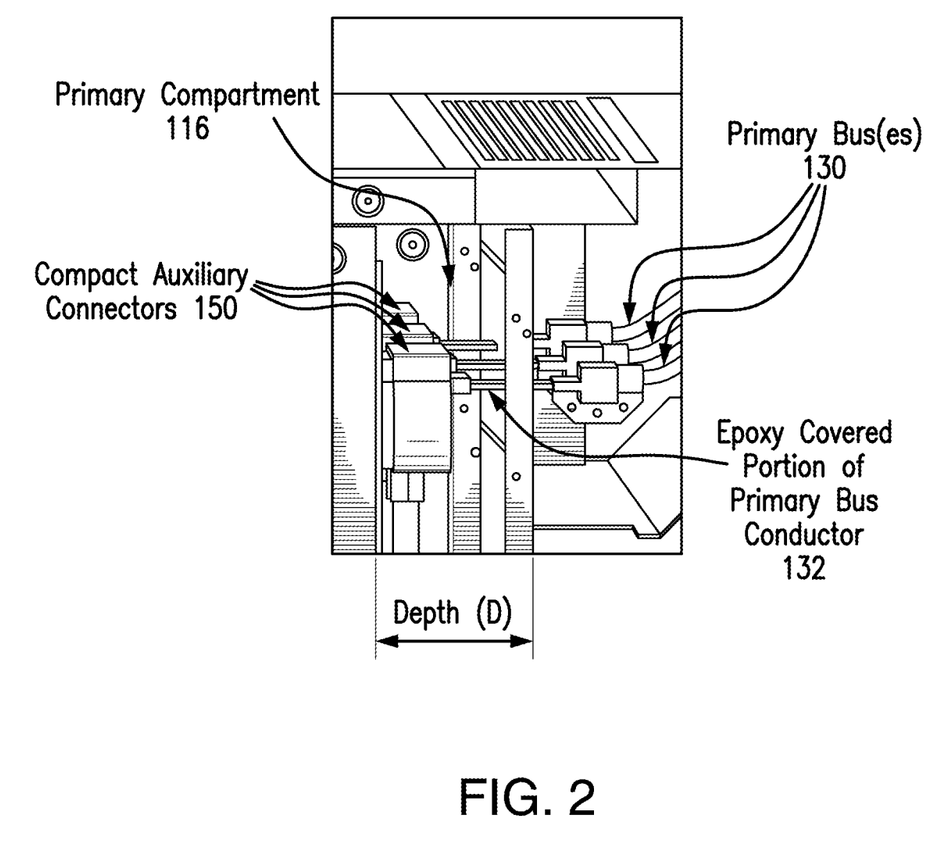
FIG. 2 illustrates an enlarged partial cross-sectional view of a compact auxiliary connector(s) of FIG. 1 providing live connection between an auxiliary device and a bus, in accordance with an embodiment described herein.

As further shown in FIG. 1, a compact auxiliary connector 150 is provided for each power phase to electrically connect the transformers 120 and 122 and a bus, such as the primary bus 130, to each other. As shown in FIGS. 1 and 2, the primary bus 130 (e.g., of a line bus), for each phase can be connected to a respective compact auxiliary connector 150. An epoxy can be applied to a portion of a conductor 132 of the primary bus 130, which would otherwise be exposed, when connected to the compact auxiliary connector 150 in the primary compartment 116. The conductor 132 can be a flat conductor with one end connected or connectable to a cable of the primary bus 130, and the other end connectable to the compact auxiliary connector 150 (or a conductor therein). The epoxy can be formed of a dielectric material or other insulating material. The primary compartment 116 can have a depth D, as shown in FIG. 2.

Figure 3:
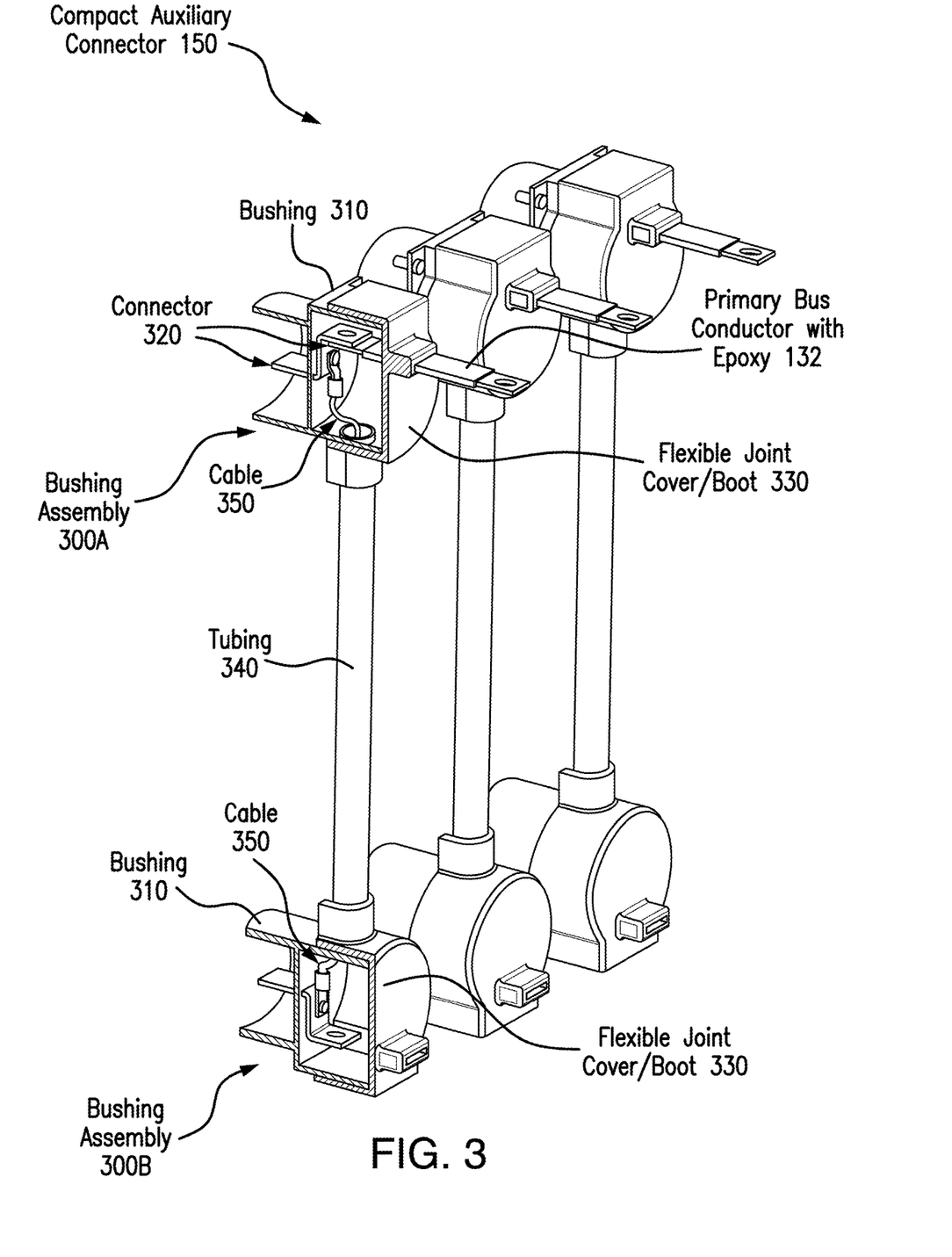
FIG. 3 illustrates a perspective view of a plurality of compact auxiliary connector(s) of FIG. 1 with a portion of bushing assemblies of one of the compact auxiliary connectors cut out to provide an internal view of the connectors and components therein, in accordance with an embodiment described herein.

FIG. 3 illustrates a perspective view of the plurality of compact auxiliary connector(s) 150 of FIG. 1 with a portion of bushing assemblies of one of the connectors cut out to provide an internal view of the connectors and components therein, in accordance with an embodiment. As shown in FIG. 3, each compact auxiliary connector 150 can include two bushing assemblies 300A, 300B (each assembly also referred generally as "300"). Each bushing assembly 300A, 300B includes a bushing 310 with an electrical connector 320 therein, and a flexible joint cover 330 for covering a portion of the bushing 310 and connections therein. The compact auxiliary connector 150 also includes tubing (or tube) 340 which is connected between the two bushing assemblies 300A and 300B and houses an electrical cable 350 which is connected between the electrical connectors 320 of the two bushing assemblies 310A, 310B. Although the tubing 340 is shown as being cylindrical in shape, the tubing 340 can have any suitable shape, size and/or length according to the application. The tubing 340 can be formed of an insulating material. In this example, the tubing 340 can be a phenolic tubing.

Figure 4:
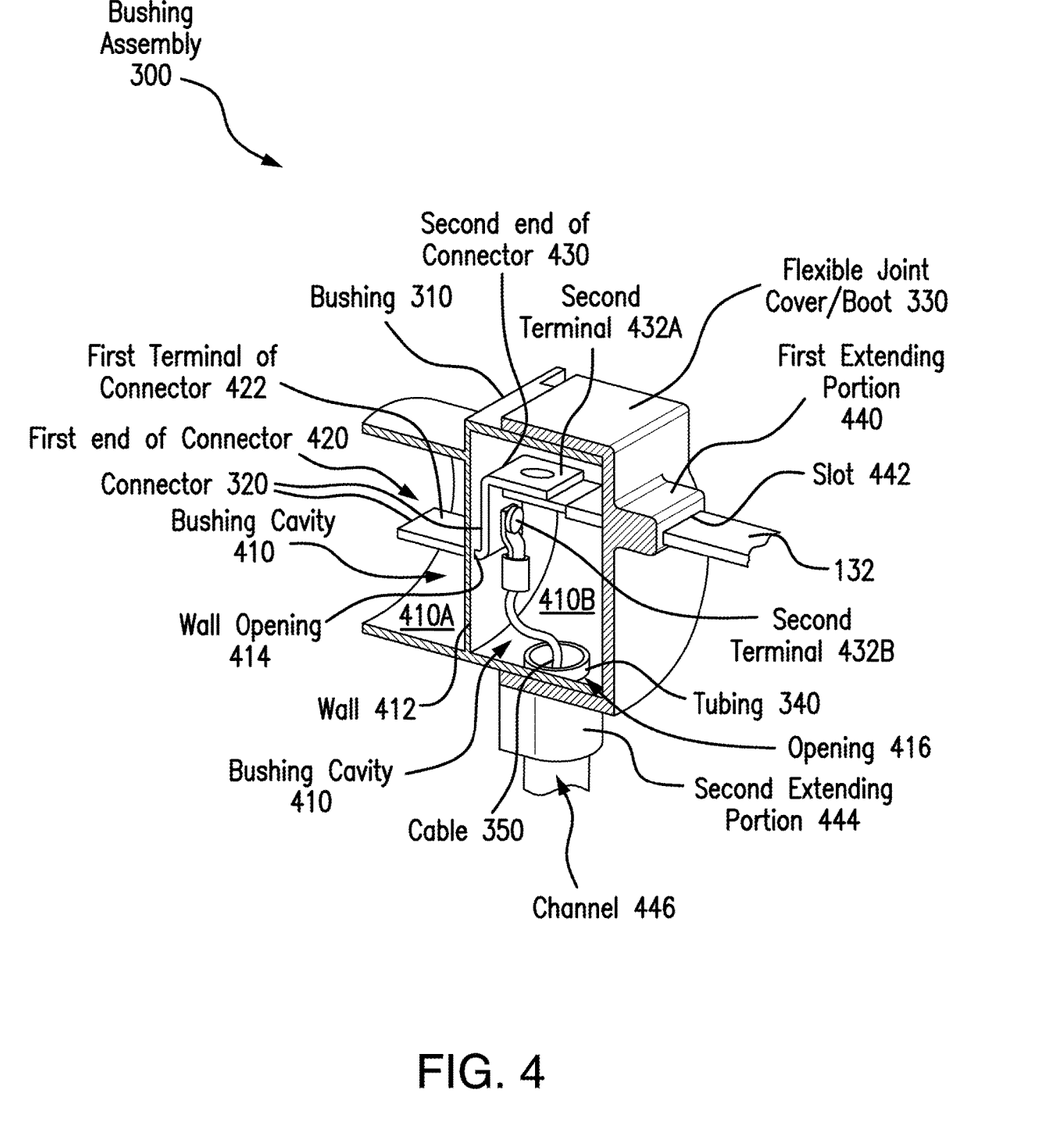
FIG. 4 illustrates a cross-sectional view of the bushing assembly for a compact auxiliary connector of FIG. 1, in accordance with an embodiment described herein.

As further shown in FIG. 4, the bushing 310 includes a cavity 410 therein. The bushing 310 also includes a wall 412 (e.g., wall, partition, etc.), which separates the cavity 140 into a first cavity 410A and a second cavity 410B each of which open to first and second open ends respectively. The wall 412 includes an opening 414, which extends between the first and second cavities 410A and 410B and receives a portion of the connector 320 therethrough. The bushing 310 also includes an opening 416 for receiving an open-end portion of the tubing 340. The bushing 410 can be formed of an insulating material. The bushing 310 can have a generally cylindrical shape. In this example, the first cavity 410A has a cross-sectional area, which is smaller than the second cavity 410B (e.g., the diameter of the first cavity 410A is smaller than the diameter of the second cavity 410B). The bushing 310 and portion thereof can be a rigid component, which can have any desired size, shape or dimension depending on the application. For example, the size and shape of the open-ended portion of the bushing 310 with the first cavity 410A can be configured to engage a connector assembly of devices connectable thereto, such as the auxiliary and other devices, described herein. When connected, the device connection to the connector 320 is covered. The bushing 310 can be formed as a single (or unitary piece) or multiple pieces connected together.

The connector 320 is formed of a conductive material, and has a first end 420 and a second end 430. The connector 320 has a portion thereof, which extends through the opening 414 of the wall 412 and is supported by the wall 412. The first end 420 of the connector 320 is arranged in the first cavity 410A, and the second end 430 of the connector 320 is arranged in the second cavity 410B. The first end 420 includes a first terminal 422 for connecting to a conductor. In this example, the first terminal 422 can be configured to connect to an electrical device, such as an auxiliary or other device of a switchgear assembly (e.g., transformer). The second end 420 can include a plurality of terminals, such as for example two separate second terminals 432A, 432B. In this example, the second terminal 432A can be configured to connect to a bus conductor, such as for example, the conductor 132 of the primary bus 130. The other second terminal 432B can be configured to connect to a conductor, such as the cable 350 which is connected between the second terminals 432B of the connectors 320 of the two bushing assemblies 310A, 310B (e.g., in FIG. 3). The first and second terminals can employ various electrical fasteners or fastening configurations to connect the connector 320 to a conductor of a device, bus or other electrical component. In this example, the connector 320 is a flat conductor with a Z-shape; however, the connector 320 can have any suitable size and shape depending on the application.

The flexible joint cover 330 is configured to connect over a portion of the bushing 310 to enclose the second cavity 410B with the second end 430 of the connector 320 and cover any connection to the second end 420. The joint flexible cover 330 includes a first extending portion 440 with a slot 442 through which to receive a conductor, such as for example from a line or load bus for connection to the second end 430 in the cavity 410B of the bushing 310. In this example, the conductor is the conductor 132 of the primary bus 130. The first extending portion 440 can have a rectangular shape. The flexible joint cover 330 also includes a second extending portion 444 with a channel 446 for receiving an end portion of the tubing 340, which has portion thereof engaged through the opening 416 of the bushing 310. The walls of the extending portion 444 may extend fully or partially around the portion of the tubing 340. In this example, the extending portion 444 extends partially around the portion of the tubing 340 to allow removal of the flexible joint cover 330 even when the tubing 340 is engaged in the opening 416 of the bushing 310. The flexible joint cover 330 can take the form of a boot which can be detachably connectable over an open portion of the bushing 310 to cover a connection(s) to the second end 430 of the connector 320, and can be made of Polyvinyl Chloride (PVC) or other flexible insulating material.

An operational installation example is described below with reference to the components of the switchgear assembly 10 of FIGS. 1-4. In this example, the control power transformer 120 is vertically stacked on top of the voltage transformer 122 in the cabinet 100. For each phase, the first end 420 of the connectors 320 of the bushing assemblies 300 (e.g., 300A and 300B) of one compact auxiliary connector 150 is connected to a connection assembly (or conductor) of the transformers 120 and 122, respectively. The conductor 132 of the primary bus 130 is extended through the slot 442 of the flexible joint cover 330, and connected to the second terminal 432A of the connector 320 of one of the bushing assemblies (e.g., 300A) in the cavity 410B. The flexible joint cover 330 can then be pulled over a portion of the bushing 310 to enclose the cavity 410B and cover the connection to the second end 430 of the connector 320.

This process can be repeated with other compact auxiliary connectors 150 to make the connections for the other phases. The reverse process can be performed to disconnect the transformers 120 and 122 from the primary bus 130. The above is simply one example of the different connection configurations, which can be made between device(s) and bus(es) in a switchgear assembly or other electrical enclosure. The compact auxiliary connector(s) 150 can be employed to connect different types and numbers of devices to different types and numbers of buses in a power distribution system.

In various embodiments, the compact auxiliary connector, described herein, can manage, among other things, the following: live part connection to an auxiliary device (e.g., transformer fuse of a transformer); live part connection to a primary bus; and cable connection housed in a phenolic tubing to make primary connection to two auxiliary devices (e.g., two transformers such as control power transformer and voltage transformer). Epoxy can be used on the primary bus coupled with a flexible joint cover (e.g., a boot) which can be made in a suitable size and dimension to cover an opening of the bushing and formed from a high dielectric strength flexible PVC material. The compact auxiliary connector can maintain required clearances and required tracking distance to perform in a 15 kV, 95 kvBIL application (or voltage class). Furthermore, the compact auxiliary connector can allow for a relatively small Medium Voltage (MV) primary compartment with a depth D at or around 5.5 inches (139.7 mm) or less compared to a compartment depth on some other MV switchgear assemblies which may need 14.5 inches (368.3) using cables or buses. This represents a 60% decrease in compartment size resulting in a smaller foot print for the switchgear cabinet or compartments therein.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A connector assembly for connecting a bus to one or more auxiliary devices in a switchgear assembly, the connector assembly comprising:
   first and second bushing assemblies, each of the first and second bushing assemblies including:
      a bushing having opposing first and second open ends with a cavity extending therethrough, the cavity being separated by a wall into first and second cavities which open to first and second open ends respectively, the wall having an opening extending between the first and second cavities, the bushing formed of an insulating material,
      a connector formed of a conductive material and arranged in the cavity, the connector having a portion extending through the opening of the interior wall, the connector having a first end with a first terminal in the first cavity of the bushing and an opposing second end in the second cavity, and
      a flexible joint cover connectable over a portion of the bushing to enclose the second cavity with the second end of the connector, the flexible joint cover having a first slot through which to receive a conductor from a line or load bus for connection to the second end; and
   a tubing, connected between the flexible joint covers of the first and second bushing assemblies, for housing a conductive cable which is connected between the second ends of the connectors of the first and second bushing assemblies.

2. The connector assembly of claim 1, wherein the second end of the connector includes at least two second terminals separated from each other, the conductive cable being connected between one of the two second terminals of the first bushing assembly and one of the two second terminals of the second bushing assembly.

3. The connector assembly of claim 1, wherein the first terminal of the connector for each of the first and second bushing assemblies is configured to connect to a terminal of a device in a compartment of a switchgear cabinet of a switchgear assembly.

4. The connector assembly of claim 3, wherein the first device is a control power transformer or a voltage transformer.

5. The connector assembly of claim 3, wherein the first and second bushing assemblies along with the tubing utilize 5.5 or fewer inches in depth of a primary compartment of the switchgear cabinet to electrically connect a line or load bus to the first device.

6. The connector assembly of claim 3, wherein the first and second bushing assemblies together with the tubing are configured to operate in a voltage class of 15 kV, 95 kV Basic Insulation Level (BIL).

7. The connector assembly of claim 1, wherein the flexible joint cover comprises a polyvinyl chloride (PVC) boot which is detachably connectable over the portion of the bushing to enclose the second cavity with the second end.

8. The connector assembly of claim 1, wherein the tubing comprises a phenolic tube.

9. The connector assembly of claim 1, wherein each connector of the first and second bushing assemblies has a Z-shape.

10. A switchgear assembly comprising:
    a switchgear cabinet including an auxiliary compartment, a cable compartment and a bus bar compartment;
    a multi-phase power bus system including line and load buses for distributing multi-phase power;
    a first device in the auxiliary compartment of the switchgear cabinet; and
    a plurality of the connector assemblies of claim 1 each for a respective power phase, each of the connector assemblies having the first terminal of the connector of one of the first or second bushing assembly connected to the first device for a respective power phase and the second end of the connector of the first or second bushing assembly connected to a respective power phase of the line or load bus of the multi-phase power bus system.

11. The switchgear assembly of claim 10, further comprising:
    a second device in the auxiliary compartment of the switchgear cabinet, the first and second devices being mounted vertically next to one another in the auxiliary compartment,
    wherein each of the connector assemblies has the first terminal of the other one of the first or second bushing assembly connected to the second device for a respective power phase.

12. The switchgear assembly of claim 11, wherein the first device is a control power transformer and the second device is a voltage transformer.

13. The switchgear assembly of claim 10, wherein the first and second bushing assemblies along with the tubing utilize 5.5 or fewer inches in depth of the switchgear cabinet to electrically connect a line or load bus to the first device.

14. The switchgear assembly of claim 10, wherein each of the connector assemblies is configured to operate in a voltage class of 15 kV, 95 kV Basic Insulation Level (BIL).

15. A connector assembly for connecting a bus to one or more auxiliary devices in a switchgear assembly, the connector assembly comprising:
    first and second bushing assemblies, each of the first and second bushing assemblies comprising:
       a bushing having opposing first and second open ends with a cavity extending therethrough, the cavity being separated by a wall into first and second cavities which open to first and second open ends respectively, the wall having an opening extending between the first and second cavities,
       a connector formed of a conductive material and arranged in the cavity, the connector having a portion extending through the opening of the interior wall, and
       a flexible joint cover connectable over a portion of the bushing to enclose the second cavity with the second end of the connector, the flexible joint cover having a first slot through which to receive a conductor for connection to the second end; and a tubing, connected between the flexible joint covers of the first and second bushing assemblies, for housing a conductive cable which is connected between the second ends of the connectors of the first and second bushing assemblies.

16. The connector assembly of claim 15, wherein the connector further comprises a second end that includes at least two second terminals separated from each other, the conductive cable being connected between one of the two second terminals of the first bushing assembly and one of the two second terminals of the second bushing assembly.

17. The connector assembly of claim 15, wherein the connector further comprises a first terminal for each of the first and second bushing assemblies, wherein the first terminal is configured to connect to a terminal of a device in a compartment of a switchgear cabinet of a switchgear assembly.

18. The connector assembly of claim 17, wherein the first device is a control power transformer or a voltage transformer, wherein the first and second bushing assemblies along with the tubing utilize 5.5 or fewer inches in depth of a primary compartment of the switchgear cabinet to electrically connect a line or load bus to the first device, and wherein the first and second bushing assemblies together with the tubing are configured to operate in a voltage class of 15 kV, 95 kV Basic Insulation Level (BIL).

19. The connector assembly of claim 15, wherein the flexible joint cover comprises a polyvinyl chloride (PVC) boot which is detachably connectable over the portion of the bushing to enclose the second cavity with the second end.

20. The connector assembly of claim 15, wherein the tubing comprises a phenolic tube, and wherein each connector of the first and second bushing assemblies has a Z-shape.

* * * * *